(12) United States Patent
Job et al.

(10) Patent No.: US 10,131,383 B2
(45) Date of Patent: Nov. 20, 2018

(54) REINFORCED TEXTILE WHEEL ARCH LINERS

(71) Applicant: Ford Global Technologies, LLC, Dearborn, MI (US)

(72) Inventors: David Job, Viewbank (AU); Daniel Dawson, Seymour (AU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/668,462

(22) Filed: Aug. 3, 2017

(65) Prior Publication Data

US 2018/0050731 A1 Feb. 22, 2018

(30) Foreign Application Priority Data

Aug. 19, 2016 (CN) .......................... 2016 1 0698410

(51) Int. Cl.
*B62D 25/18* (2006.01)
*B62D 25/16* (2006.01)

(52) U.S. Cl.
CPC .......... *B62D 25/161* (2013.01); *B62D 25/18* (2013.01)

(58) Field of Classification Search
CPC .... B62D 25/16; B62D 25/161; B62D 25/168; B62D 25/182; B62D 25/184; B62D 25/188; B62D 25/072
See application file for complete search history.

(56) References Cited

U.S. PATENT DOCUMENTS

| | | | | |
|---|---|---|---|---|
| 5,280,960 A * | 1/1994 | Casey | ................ | B60R 13/0861 280/848 |
| 6,799,782 B2 * | 10/2004 | Jain | ...................... | B62D 25/161 280/847 |
| 6,821,605 B2 * | 11/2004 | Fiorinelli | ............ | B29C 44/0446 296/198 |
| 6,953,205 B2 * | 10/2005 | Friest | .................. | B60R 13/0861 280/154 |
| 8,167,335 B2 * | 5/2012 | Takeuchi | .................. | B26F 1/24 264/156 |
| 8,973,981 B2 * | 3/2015 | Vaughn, Jr. | ......... | B60R 13/0861 296/198 |
| 9,428,121 B2 * | 8/2016 | Vaughn, Jr. | ......... | B60R 13/0861 |

FOREIGN PATENT DOCUMENTS

| | | |
|---|---|---|
| DE | 102008047044 A1 | 5/2009 |
| DE | 102010049598 A1 | 10/2011 |
| DE | 102012023875 | 8/2013 |
| DE | 102013010939 A1 | 1/2014 |
| EP | 0952068 A2 | 3/1999 |
| EP | 1289823 B1 | 7/2005 |
| WO | 20121538168 A1 | 11/2012 |

* cited by examiner

Primary Examiner — James A Shriver, II
Assistant Examiner — James J Triggs
(74) Attorney, Agent, or Firm — Jason Rogers; Mohr IP Law Solutions, PC

(57) ABSTRACT

Reinforced textile wheel arch liners including a reinforced textile wheel arch liner comprised of a base layer and a reinforcing layer. The base layer and reinforcing layers are comprised at least partially of a thermoformable textile material and disposed upon and bonded to at least part of the base layer. In some examples, the base layer and reinforcing layer are formed separately. In some further examples, the reinforcing layer can be formed as part of the base layer in a single die that would otherwise be off-cut.

15 Claims, 5 Drawing Sheets

REINFORCED TEXTILE WHEEL ARCH LINERS

RELATED APPLICATION

This application claims the benefit of Chinese Patent Application No.: CN 201610698410.7 filed on Aug. 19, 2016, the entire contents thereof being incorporated herein by reference.

FIELD

The present disclosure relates generally to wheel arch liners for vehicles, in particular, wheel arch liners constructed at least partially from thermoformable textiles and including a reinforcement section are described.

BACKGROUND

Wheel arch liners are installed in vehicle wheel wells, underneath the fenders, and from the perspective of a viewer looking at a wheel well are located up above and extend back behind the wheel. Wheel arch liners serve two primary functions: First, they chiefly protect the interior of a vehicle's body and proximate components from exposure to high speed dirt, debris, and road hazards that may be picked up and flung by the wheel of a vehicle while in motion. Similarly, a wheel arch liner can serve to contain tire fragments in the event of a blowout. Without a wheel arch liner, such debris at best would create annoyingly loud impact sounds as metallic or hard plastic vehicle body components were struck by solid debris, or at worst would damage vehicle body components, potentially with dangerous results. Second, wheel arch liners can act as a first-line sound barrier to absorb wheel and road noise, and prevent it from being transmitted to the vehicle's cabin.

Known wheel arch liners are not entirely satisfactory for the range of applications in which they are employed. For example, existing wheel arch liners are commonly manufactured from a plastic such as polypropylene or high-density polyethylene, and formed using an injection molding process. Injection molded polypropylene wheel arch liners are typically used, as they have established good performance characteristics in wheel arch applications. Furthermore, for large batch quantities, injection molding offers an attractively low per part production cost, and with an appropriately designed mold, the ability to have continuously varying material thicknesses or even densities to provide additional structural reinforcement and rigidity in places most likely to receive wear from road debris. However, the injection molding process first requires the creation of a tooling for production, specifically, a custom mold in the shape of the wheel arch liner compatible with the injection molding equipment intended to be used for production. The creation of such custom tooling imposes a significant initial cost, and consequently is best suited only for those times when a high volume of part production is anticipated. Conversely, for small job runs or one-offs, such as in the case of limited run vehicles, injection molding proves impractical as it imposes a significant financial strain on a project's budget.

Thermoformable textile materials can possess durability comparable to injection molded polypropylene, and can often be used in manufacture at a cost lower than injection molded polypropylene. However, textile materials heretofore have lacked adequate rigidity and stiffness to be employed in wheel arch liner applications, where a durable rigidity is required. Moreover, textiles typically come in a single thickness, and thus present a challenge where additional structural rigidity is required in only certain areas.

Hot-molding is a known technique where materials for an object are placed into a mold, and then the mold is closed and heated so as to cause the materials within to take on and retain the shape of the mold. The production of such molds and heating not constrained to particular types of equipment, such as an injection molding machine. Consequently, hot-molding presents a possible alternative to injection molding for parts formation. German Patent Application Publication No. DE102010049598 A1 (the "598 publication" is directed to a liner for a wheel arch that is formed as a molded part. The 598 publication discloses using a composite or possible textile material in a hot mold, but still uses a partially injected area around the edge of the arch to provide enhanced wear resistance.

Thus, there exists a need for wheel arch liners that improve upon and advance the design of known wheel arch liners. Examples of new and useful wheel arch liners relevant to the needs existing in the field are discussed below.

SUMMARY

The present disclosure is directed to a reinforced textile wheel arch liner comprised of a base layer and a reinforcing layer.

According to one aspect, the base layer and reinforcing layer are at least partially comprised of a thermoformable textile material, with the reinforcing layer bonded to the base layer.

In one embodiment, the reinforcing layer is separate from the base layer.

In another embodiment, the base layer is comprised of a first layer of thermoformable textile material, a second layer of thermoformable textile material, and a layer of fibrous moldable material disposed between the first and second layers.

In another embodiment, the reinforcing layer is comprised of a first layer of thermoformable textile material, a second layer of thermoformable textile material, and a layer of fibrous moldable material disposed between the first and second layers.

In another embodiment, the base layer is comprised of a first layer of thermoformable textile material, a second layer of thermoformable textile material, and a layer of fibrous moldable material disposed between the first and second layers; and the reinforcing layer is comprised of a first layer of thermoformable textile material, a second layer of thermoformable textile material, and a layer of fibrous moldable material disposed between the first and second layers. The base layer and the reinforcing layer are bonded together under heat and pressure.

In another embodiment, the reinforcing layer is bonded to the base layer using one or more fasteners, glue, or vibration welding.

In another embodiment, the reinforcing layer is sized to cover the entire base layer.

In yet another embodiment, the reinforcing layer is formed from a portion of the base layer doubled over to dispose upon part of the base layer.

According to another aspect, at least a portion of a surface of the base layer and a surface of the reinforcing layer include a plurality of ribs so as to form a space between the base layer and reinforcing layer.

In still another embodiment, the base and reinforcing layers are comprised of a first and second layer of thermoformable textile material, with a layer of fibrous plastic moldable material disposed between the first and second layers.

In another embodiment, there is an air gap between at least part of the reinforcing layer and the base layer.

In another embodiment, the reinforcing layer is disposed on an end portion of the base layer that is opposite to the front of a vehicle when the wheel arch liner is installed in the vehicle.

According to another aspect, a method of creating a reinforced textile wheel arch liner is disclosed, the method comprising forming a base layer at least partially of textile material and moldable material, forming a reinforcing layer at least partially of textile material and moldable material, and bonding the reinforcing layer to at least a portion of the base layer, where the base layer and reinforcing layers are formed by heating the base layer and the reinforcing layer in a die to melt the moldable material, and cooling the base layer and the reinforcing layer so that the base layer and the reinforcing layer retain the shape of the die.

In one embodiment, the base layer and the reinforcing layer further comprise a first and second layer of a scrim textile material, and the moldable material comprises meltable fibrous plastic particles disposed between the first and second layers of scrim textile material.

In another embodiment, the reinforcing layer is bonded to at least a portion of the base layer using one or more fasteners, glue, or vibration welding.

In another embodiment, the reinforcing layer is formed in a separate step from the base layer.

In another embodiment, the reinforcing is formed as a part of the base layer, and bonding the reinforcing layer to at least a portion of the base layer further comprises folding over the reinforcing layer part of the base layer and bonding the reinforcing layer part of the base layer to the base layer.

In another embodiment, the base layer and the reinforcing layer are formed of structural features on at least one surface of the base layer and the reinforcing layer, respectively.

The base layer and reinforcing layers are comprised at least partially of a textile material and disposed upon and bonded to at least part of the base layer. The use of a textile material allows the wheel arch liner to be formed using a low-cost die setup that can be operated manually or with automation that is well-known in the art, as opposed to an injection molding process that requires the preparation of an expensive mold that is custom designed for the injection molding equipment to be utilized. In some embodiments, the base layer and reinforcing layer are formed separately, thereby enabling differing construction between the base layer and reinforcing layer. In other embodiments, the reinforcing layer can be formed as part of the base layer in a single die that would otherwise be off-cut, thereby reducing the number of forming steps that are necessary to produce the wheel arch liner.

DETAILED DESCRIPTION

The disclosed reinforced textile wheel arch liners will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various reinforced textile wheel arch liners are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
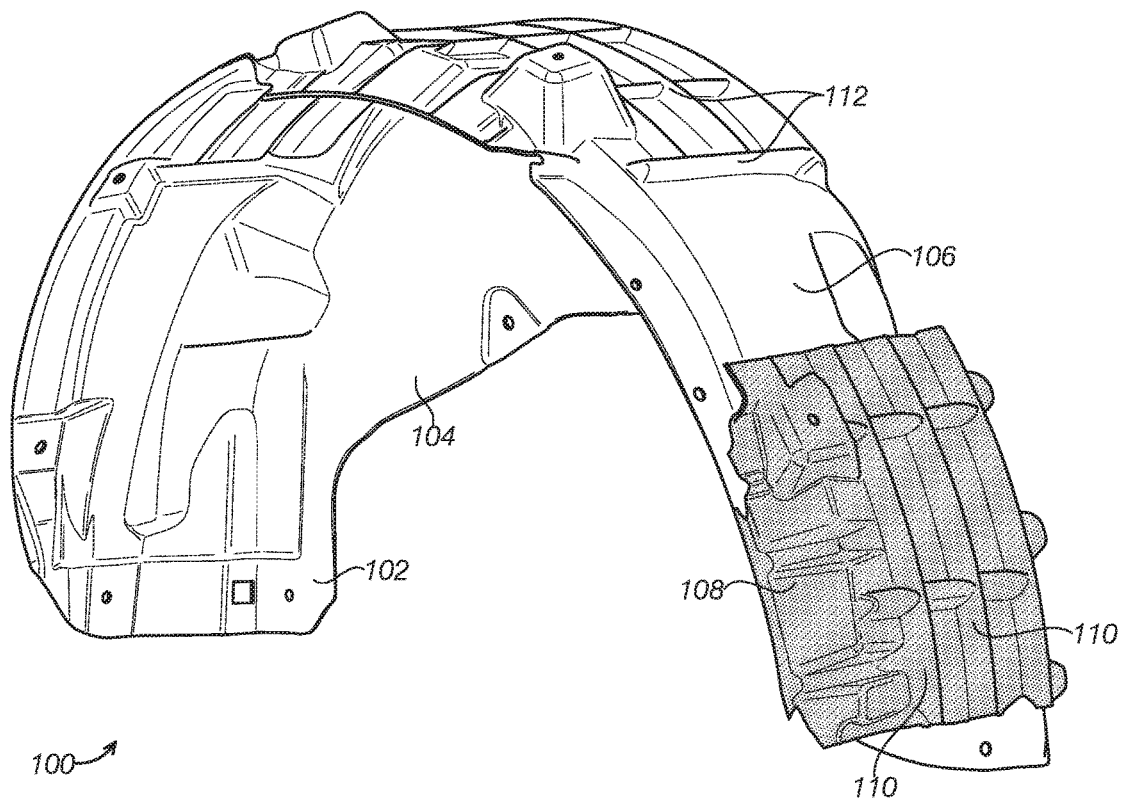
FIG. 1 is a perspective view of a first example of a reinforced textile wheel arch liner.
Figure 2:
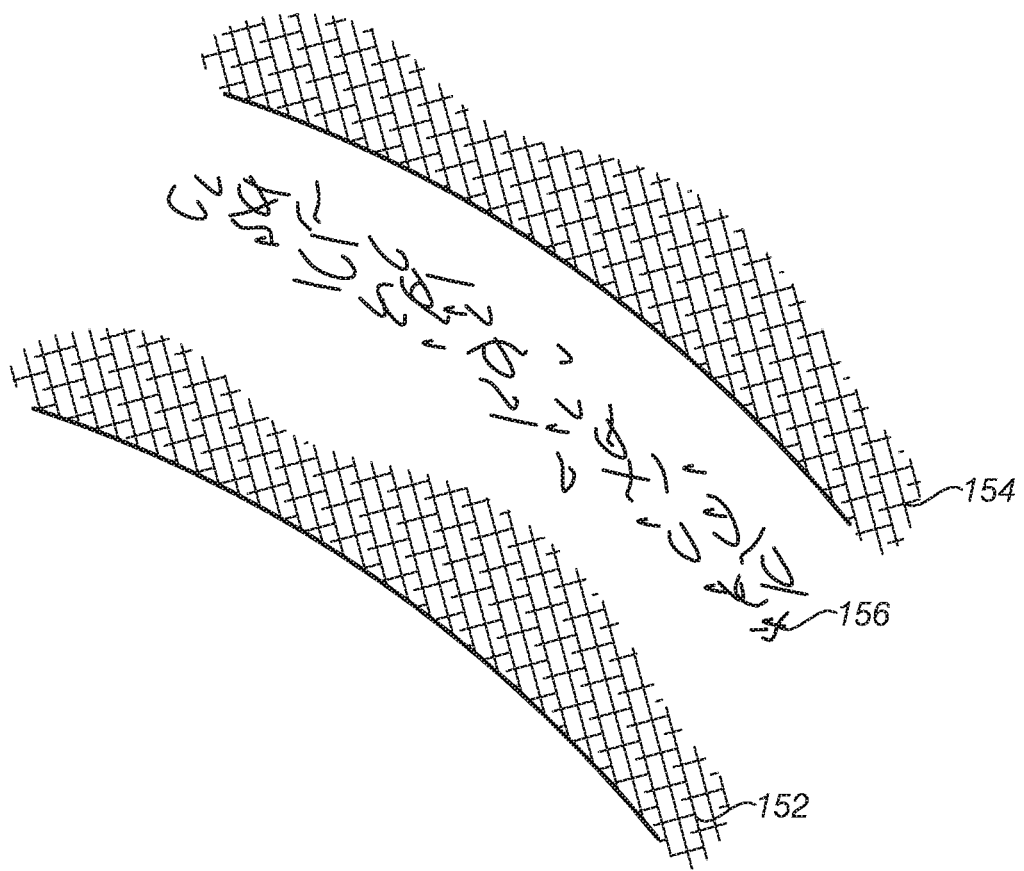
FIG. 2 is a cross-sectional view of the layers comprising the preferred construction of the reinforced textile wheel arch liner shown in FIG. 1.
Figure 3:
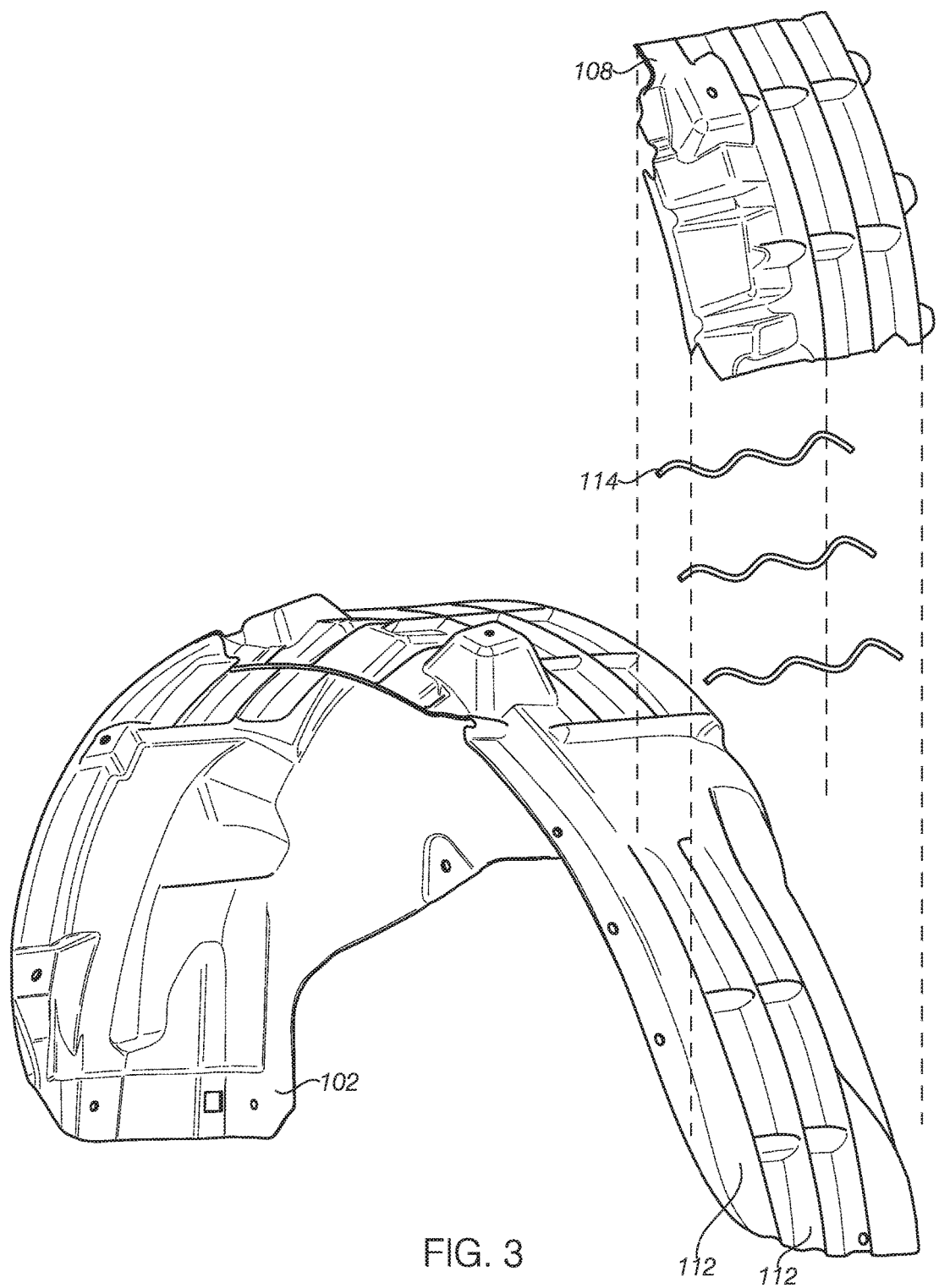
FIG. 3 is an exploded perspective view of a second example of the reinforced textile wheel arch liner shown in FIG. 1.

With reference to FIGS. 1-3, a first example of a reinforced textile wheel arch liner, wheel arch liner 100, will now be described. Wheel arch liner 100 functions to provide a durable, sound-absorbent and puncture resistant wheel arch liner that is more economical to manufacture than traditional wheel arch liners. The reader will appreciate from the figures and description below that wheel arch liner 100 addresses shortcomings of conventional wheel arch liners.

For example, wheel arch liner 100 is simultaneously rigid and puncture resistant, similar to prior art wheel arch liners, while providing a lower cost of production. Further, wheel arch liner can be produced by hand or machine, using a variety of equipment and techniques that do not require specific customized molds. The resulting wheel arch liners have a strength and functionality comparable, if not improved over, existing injection-molded wheel arch liners.

Wheel arch liner 100 includes a base layer 102 which includes an interior side 104 and an exterior side 106. Onto exterior side 106 is disposed a reinforcing layer 108. Reinforcing layer 108 is typically formed of a similar or same material as base layer 102, and is affixed onto base layer 102. In other examples, wheel arch liner 100 includes additional or alternative features, such as structural ribs or similar molded features to improve or modify the overall rigidity of wheel arch liner 100. Reinforcing layer 108 acts to double the thickness of wheel arch liner 100 where it is positioned upon base layer 102, thereby increasing the rigidity and puncture and wear resistance of wheel arch liner 100 in the area of reinforcing layer 108. Reinforcing layer 108 is preferably positioned upon the area of base layer 102 where the likelihood of exposure to and direct impact from road hazards is greatest.

As can be seen in FIG. 1, base layer 102 includes a shape molded to fit within the wheel well of a vehicle, in the portion known as the arch. A portion of the perimeter of the base layer 102 typically attaches to the inside of the fender, while the opposing portion of the base layer 102 typically attaches to either a frame or body structure above the wheel and axle of the vehicle. Interior side 104 faces the wheel. Exterior side 106 faces up into the vehicle body. Base layer 102 thus acts to absorb tire and road noise, as well as to absorb the impact of road hazards such as rocks and gravel that may be kicked up by the tire.

Base layer 102 is sized to closely fit within a vehicle wheel well. Accordingly, the size of base layer 102 determines the inner size and dimensions of the wheel well, and by employing a close fit is capable to protecting the interior of the vehicle frame and body from damage due to various road hazards encountered and thrown up by the wheel during vehicle travel. Base layer 102 thus is manufactured from materials that are durable and capable of withstanding impacts from small and/or potentially sharp objects such as rocks, gravel, dirt clods, and nails. Base layer 102 may be molded with one or more reinforcing ribs 112 to add structural rigidity. Although FIG. 1 depicts reinforcing ribs 112 as comprising channels that run either substantially longitudinally or transversely across base layer 102, a person skilled in the relevant art will appreciate that reinforcing ribs 112 can take any shape or geometry that will improve the structural rigidity of wheel arch liner 100.

Reinforcing layer 108 is preferably manufactured from similar materials and construction as base layer 102. As with base layer 102, reinforcing layer 108 may include reinforcing ribs 110, which are of a similar type and construction as reinforcing ribs 112. Reinforcing layer 108 is disposed upon and covers at least a portion of exterior side 106 of base layer 102. Preferably, base reinforcing layer 108 is disposed upon that portion of base layer 102 that receives the greatest number of impacts from debris kicked up from the wheel. This location is typically the first fourth or third of base layer 102 positioned aft of the wheel on the vehicle, thus receiving debris spray from the wheel as it rotates up from the ground. Reinforcing layer 108 is preferably sized to cover that area of base layer 102 that is most likely to receive an impact from debris during the course of expected vehicle operation. However, reinforcing layer 108 could be extended to completely cover all of exterior side 106, effectively doubling the layers of base layer 102.

FIG. 2 shows a cross section of the preferred construction of base layer 102 and reinforcing layer 108. Both layers are preferably comprised of a first textile layer 152 and a second textile layer 154. Between these two layers is disposed a layer of fibrous meltable plastic 156, which acts to adhere to first textile layer 152 and second textile layer 154 to form each of the base layer 102 and reinforcing layer 108. First textile layer 152 and second textile layer 154 can be made from the same, or different textile materials. Suitable materials include any fabric that offers puncture resistance and bond to a plastic substrate. Preferred materials include a thermoformable material. Other possible materials may include glass or carbon fibers, synthetic materials such as nylon or polyester, or natural materials such as cotton. The choice of material should be made with consideration given to the melting point of fibrous meltable plastic 156, such that first textile layer 152 and second textile layer 154 have a melting or charring point sufficiently above the melting point of fibrous meltable plastic 156 so as not to be damaged or structurally compromised in the hot molding process, which will be discussed in more detail below. Fibrous meltable plastic 156 can be made from any material that melts at an appropriate temperature and can bind to first textile layer 152 and second textile layer 154, but without damaging first textile layer 152 and second textile later 154. Materials may include plastic resins, polyethylene, polystyrene, fiber reinforced resins, or other similar materials now known or later developed.

It will be appreciated by a person skilled in the relevant art that FIG. 2 only depicts one possible, preferable method of construction. However, base layer 102 and reinforcing layer 108 could be formed from multiple textile material layers, multiple layers or plastic material, textile material that is pre-impregnated (prepreg) with plastic or resin, plastic sheets, a single layer of textile material and single layer of fibrous plastic material, or even just a layer of fiber-reinforced plastic or resin, or any other suitable material or combination of materials now known or later developed. Moreover, base layer 102 and reinforcing layer 108 may differ in their construction and thickness.

In the example shown in FIG. 3, the construction of wheel arch liner 100 is shown. In some embodiments, base layer 102 and reinforcing layer 108 are bonded under the heat and pressure. As described above, both layers are comprised of a first textile layer 152 and a second textile layer 154. Between these two layers is disposed a layer of fibrous meltable plastic 156. Fibrous meltable plastic 156 includes a portion of the fibrous meltable plastic that melts with heat and another portion of the fibrous plastic that does not melt and acts as a filler. During the formation of base layer 102 and reinforcing layer 108, the inner meltable portion of the filler sticks to the non-meltable portion of the filler and melts into the first textile layer 152 and the second textile layer 154. After base layer 102 and reinforcing layer 108 are formed, base layer 102 and reinforcing layer 108 are placed together by clamping both layers and heated local spots or locally compressed and heated, the portion of fibrous meltable plastic melts into both adjacent textile layers of base layer 102 and reinforcing layer 108 and forms a bond to bond base layer 102 and reinforcing layer 108 together.

Reinforcing layer 108 may be permanently bonded to base layer 102 by way of an adhesive layer 114. Adhesive layer 114 may be any substance compatible with the construction of reinforcing layer 108 and base layer 102, and capable of permanently or semi-permanently affixing reinforcing layer 108 to base layer 102. Such substances may include known adhesive systems such as epoxies, plastic resins, polyurethane adhesives, cyanoacrylate adhesives, or any other similar adhesive that can bond textile materials. Alternatively, adhesive layer 114 may instead be one or more mechanical fasteners, such as rivets, screws, nails, clips, or other similar attaching devices. Still further, adhesive layer 114 may be omitted, and reinforcing layer 108 bonded to base layer 102 by a welding technique, such as vibration welding, friction welding, or application of heat, or sewed using a filament or ribbon, such as with a thread or wire.

Figure 4:
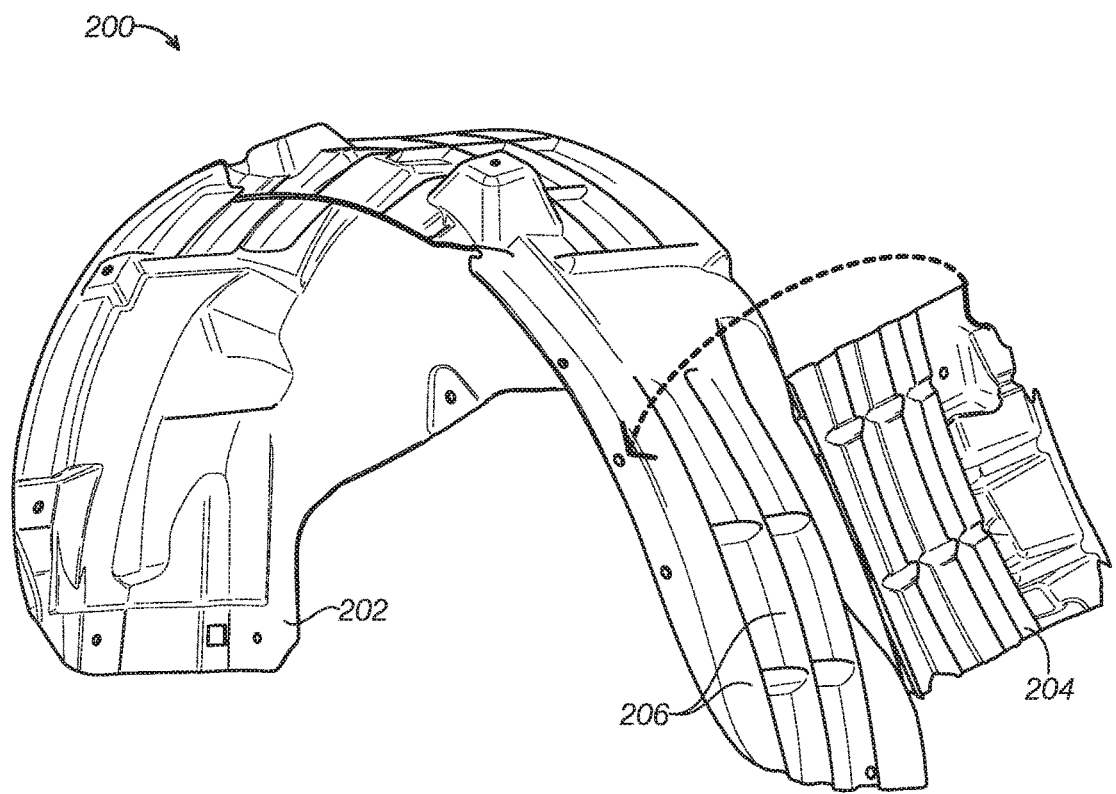
FIG. 4 is a perspective view of a second example of a reinforced textile wheel arch liner including the reinforcing layer molded as part of the base layer.

Turning attention to FIG. 4, a second example of a textile reinforced wheel arch liner, wheel arch liner 200, will now be described. Wheel arch liner 200 includes many similar or identical features to wheel arch liner 100. Thus, for the sake of brevity, each feature of wheel arch liner 200 will not be redundantly explained. Rather, key distinctions between wheel arch liner 200 and wheel arch liner 100 will be described in detail and the reader should reference the discussion above for features substantially similar between the two textile reinforced wheel arch liners.

As can be seen in FIG. 4, wheel arch liner 200 includes a base layer 202 and reinforcing layer 204. As with wheel arch liner 100, base layer 202 and reinforcing layer 204 can possess a series of reinforcing ribs. Also, base layer 202 and reinforcing layer 204 are constructed using similar materials and techniques as base layer 102 and reinforcing layer 108 of wheel arch liner 100.

However, as also seen in FIG. 4, reinforcing layer 204 is molded and/or constructed as an extension of base layer 202, and is physically connected to base layer 202. Reinforcing layer 202 is folded over upon base layer 202, and affixed thereupon using any of the means described above for attaching reinforcing layer 108 upon base layer 102 in wheel arch liner 100. Manufacturing reinforcing layer 204 as a part of base layer 202 can be used to simplify construction of wheel arch liner 200 and by extension the associated manufacturing costs and time. Also seen in FIG. 4 are reinforcing ribs 206, that can be molded to the portion of base layer 202 doubled by reinforcing layer 204, thereby increasing the strength of the reinforced base layer section. Similar reinforcing ribs 112 are seen in FIG. 3.

While FIG. 4 shows that the extension for reinforcing layer 204 is located on one side of the base layer 202, it will be appreciated that the extension for the reinforcing layer can be located on an end or both ends of the base layer.

Figure 5A:
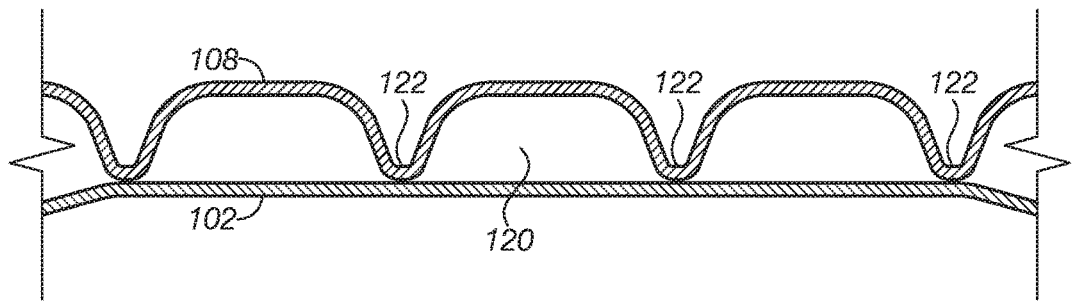
FIG. 5A is a cross-sectional view of a portion of the reinforced textile wheel arch liner of FIG. 1 showing the arrangement of the reinforcing layer upon the base layer, with the base layer not having reinforcing ribs.
Figure 5B:
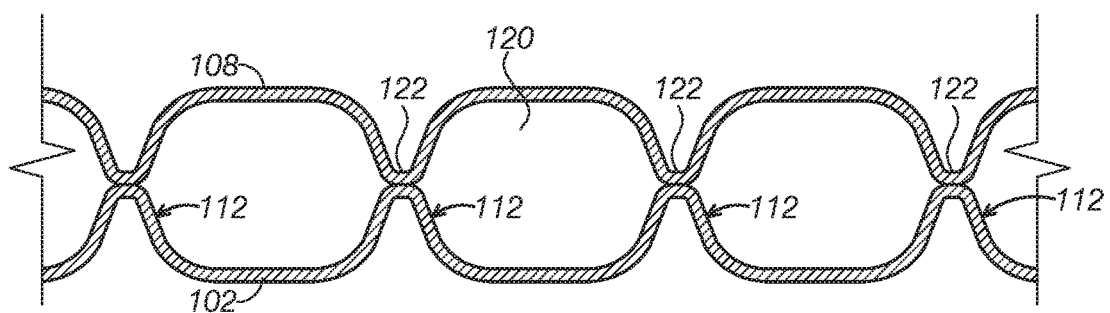
FIG. 5B is a cross-sectional view of a portion of the reinforced textile wheel arch liner of FIG. 1 showing the arrangement of the reinforcing layer upon the base layer, with the base layer having reinforcing ribs.

Referring to FIGS. 5A and 5B, a cross section view of a possible interface between base layer 102 and reinforcing layer 108 is shown. Here, reinforcing layer 108 is shown with a series of reinforcing ribs 122, the tips of which are in contact with base layer 102 or reinforcing ribs 112 of the base layer 102. Between each reinforcing rib 122 is an air gap 120. The presence of air gap 120 can aid in reducing transmitted road noise to the vehicle, as well as potentially providing a measure of impact energy absorption. FIG. 5 is equally applicable to base layer 202 and reinforcing layer 204 of wheel arch liner 200. Although FIG. 5 depicts multiple air gaps 120 formed between multiple reinforcing ribs 122, a person skilled in the relevant art will recognize that this is only one possible configuration. Reinforcing layer 108 may be bonded to base layer 102 only at its edges, with the interior reinforcing ribs not actually contacting base layer 102, so that air gap 120 runs the entire width of base layer 102 and reinforcing layer 108.

As seen in FIGS. 5A and 5B, base layer 102 may possess structural features such as reinforcing ribs 112 in lieu of, or in addition to, reinforcing ribs 122 in reinforcing layer 108.

As both the base layer and the reinforcing layer can have structural features, the resulting wheel arch liner (i.e., the bonded layer) possesses greater rigidity than the sum of individual base layer and individual reinforcing layer.

Wheel arch liners 100 and 200 are typically produced using a hot-molding process. For both base layer 102 and 202, a layer of fibrous plastic material is first disposed between a first and second layer of the desired textile material. The materials can be machine or hand-cut to the appropriate size, and machine or hand-placed into the molding die. For example, for one-offs, a manufacturer may hand-cut the first layer of textile material, place it into the molding die, hand place the layer of fibrous plastic material, and finally hand-cut and place the second layer of textile material into the die before closing the die. Higher quantity production runs may utilize more automation for greater speed and consistency. Furthermore, because the layer of fibrous plastic material is separately placed, great control over its thickness can be exercised.

The sandwich of the first layer of textile material, fibrous plastic material, and second layer of textile material is placed into a die, which is then heated at least to the temperature point at which the fibrous plastic material melts. As the fibrous plastic material melts, it forms into the shape of the die, as well as bonds to the first and second layers of textile material. The sandwich of first and second layer of textile material and fibrous plastic material is then cooled, which locks it into the shape of the die. In some embodiments, fibrous meltable plastic includes a portion of the fibrous meltable plastic that melts with heat and another portion of the fibrous plastic that does not melt and acts as a filler. The base layer is formed under heated and partially compressed, the inner meltable portion of the filler sticks to the non-meltable portion of the filler and melts into the first textile layer and the second textile layer.

The operation of the die can be automatic, or manual. Manual control, as the name suggests, involves an operator manually operating the die for materials placement, controlling the heating process of the die and timing of heat application, and controlling the cooling process. Conversely, automatic control of the die can be fully automated to include closing, heating to a predetermined temperature for a specified time, cooling at a specified rate, and opening, to provide consistent formation of the wheel arch liner. Systems for control of the die and heating process are well known in the art.

Reinforcing layer 108 and 204 are formed in the same fashion. In the case of reinforcing layer 108, a separate die dedicated to reinforcing layer 108 may be utilized. Additionally, the use of a separate die allows a different selection of materials to be utilized for reinforcing layer 108 if desired. For reinforcing layer 204, as it is an extension of base layer 202, reinforcing layer 204 is formed simultaneously and as part of base layer 202.

The die utilized for the formation of the base and reinforcing layers is designed with the appropriate dimensions, curvature, and structural features such as reinforcing ribs included. However, as the die is not used for injection molding, it need not be designed with the tolerances necessary for injection molding, nor with the robustness needed to withstand injection molding pressures. Furthermore, the die need not be designed to be compatible with any particular injection molding machine or equipment; a basic die of sufficient strength to form the layers of textile material and fibrous plastic material, and that can with stand the necessary heat and the selected heating means to bring the die to the melting point of the fibrous plastic material is sufficient. Such construction may include metal, wood, plastic, ceramic, or any other material suitably strong for supporting the die molding process. Thus, a significant savings can be realized over the tooling costs incurred for injection molding. Heating the die can be accomplished using any means of heat application now known or later developed in the relevant art. Such means could include using electric heating elements, heated fluids such as water or steam, or direct flame. The heating means could be embedded within the die so as to provide more consistent and efficient heat control and application.

Following formation of the base and reinforcing layers, the reinforcing layer is bonded to the base layer in its designated location using one of the adhesives or fasteners described above. As with hot molding, bonding may be accomplished manually or via mechanical automated means.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A wheel arch liner, comprising:
   a base layer, comprised at least partially of a thermoformable textile material; and
   a reinforcing layer, comprised at least partially of a thermoformable textile material and disposed upon and bonded to at least part of the base layer,
   wherein the base layer further comprises:
   a first layer of a thermoformable textile material;
   a second layer of a thermoformable textile material; and
   a layer of fibrous moldable material disposed between the first layer and second layer; and
   wherein the reinforcing layer further comprises:
   a first layer of a textile material;
   a second layer of a textile material; and
   a layer of fibrous moldable material disposed between the first layer and second layer.

2. The wheel arch liner of claim 1, wherein the base layer and reinforcing layer are bonded together under heat and pressure.

3. The wheel arch liner of claim 1, wherein the reinforcing layer is bonded to the base layer using one or more fasteners, or glue, or vibration welding.

4. The wheel arch liner of claim 1, wherein the reinforcing layer is sized to cover the entire base layer.

5. The wheel arch liner of claim 1, wherein the reinforcing layer is formed by folding over a portion of the base layer and bonding it to the at least part of the base layer.

6. The wheel arch liner of claim 1, wherein at least portion of a surface of the base layer and a surface of the reinforcing layer include a plurality of ribs so as to form a space between the base layer and the reinforcing layer.

7. A wheel arch liner in a vehicle, comprising:
   a base layer; and
   a reinforcing layer, wherein:
   the base and reinforcing layers further comprise:
   a first layer of a thermoformable textile material,
   a second layer of a thermoformable textile material, and
   a layer of fibrous plastic moldable material disposed between the first and second layers;
   the reinforcing layer is disposed upon and bonded to at least a part of the base layer; and
   the base layer and the reinforcing layer include structural features, wherein the structural features include a plurality ribs disposed on at least one surface of the base layer and the reinforcing layer.

8. The wheel arch liner of claim 7, wherein the reinforcing layer is separate from the base layer.

9. The wheel arch liner of claim 7, wherein the reinforcing layer is formed by folding over a portion of the base layer and bonding it to the base layer.

10. The wheel arch liner of claim 7, wherein there is an air gap between at least part of the reinforcing layer and the base layer.

11. The wheel arch liner of claim 7, wherein the reinforcing layer is disposed on an end portion of the base layer that is opposite to a front of the vehicle when installed in the vehicle.

12. A wheel arch liner, comprising:
   a base layer, comprised at least partially of a thermoformable textile material; and
   a reinforcing layer, comprised at least partially of a thermoformable textile material and disposed upon and bonded to at least part of the base layer,
   wherein the reinforcing layer is formed by folding over a portion of the base layer and bonding it to the at least part of the base layer.

13. The wheel arch liner of claim 12, wherein the reinforcing layer is bonded to the base layer using one or more fasteners, or glue, or vibration welding.

14. The wheel arch liner of claim 13, wherein the base layer further comprises:
   a first layer of a thermoformable textile material;
   a second layer of a thermoformable textile material; and
   a layer of fibrous moldable material disposed between the first layer and second layer; and
   wherein the reinforcing layer further comprises:
   a first layer of a textile material;
   a second layer of a textile material; and
   a layer of fibrous moldable material disposed between the first layer and second layer.

15. The wheel arch liner of claim 12, wherein the base layer and reinforcing layer are bonded together under heat and pressure.

* * * * *